United States Patent
Dubinsky

(10) Patent No.: US 9,213,557 B2
(45) Date of Patent: Dec. 15, 2015

(54) METHOD AND SYSTEM FOR EMBEDDING USER ASSISTANCE IN DOCUMENTS UTILIZING MARKUP LANGUAGES

(76) Inventor: Andrew M. Dubinsky, Houston, TX (US)

(*) Notice: Subject to any disclaimer, the term of this patent is extended or adjusted under 35 U.S.C. 154(b) by 1641 days.

(21) Appl. No.: 11/297,650

(22) Filed: Dec. 8, 2005

(65) Prior Publication Data

US 2006/0150151 A1 Jul. 6, 2006

Related U.S. Application Data

(60) Provisional application No. 60/634,188, filed on Dec. 8, 2004.

(51) Int. Cl.
| | | |
|---|---|---|
| *G06F 17/00* | (2006.01) | |
| *G06F 9/44* | (2006.01) | |
| *G06F 17/30* | (2006.01) | |
| *G06F 17/21* | (2006.01) | |
| *G06F 17/22* | (2006.01) | |
| *G06F 17/24* | (2006.01) | |
| *G06Q 10/10* | (2012.01) | |

(52) U.S. Cl.
CPC ............ *G06F 9/4446* (2013.01); *G06F 17/218* (2013.01); *G06F 17/2247* (2013.01); *G06F 17/241* (2013.01); *G06F 17/3089* (2013.01); *G06F 17/30882* (2013.01); *G06F 17/30887* (2013.01); *G06Q 10/10* (2013.01)

(58) Field of Classification Search
CPC . G06F 9/4446; G06F 17/218; G06F 17/2247; G06F 17/241; G06F 17/3089; G06F 17/243; G06F 17/2235; G06F 17/30887; G06F 17/30882; G06F 17/30014; G06Q 10/10
USPC .................. 715/200–202, 205, 209, 234, 760
See application file for complete search history.

(56) References Cited

U.S. PATENT DOCUMENTS

| | | | | |
|---|---|---|---|---|
| 6,128,635 A * | 10/2000 | Ikeno | ........................... | 715/246 |
| 6,185,587 B1 * | 2/2001 | Bernardo et al. | ............. | 715/234 |
| 6,542,897 B2 * | 4/2003 | Lee | ............... | 707/102 |
| 6,629,134 B2 * | 9/2003 | Hayward et al. | .............. | 709/217 |
| 6,684,369 B1 * | 1/2004 | Bernardo et al. | ............. | 715/205 |
| 7,155,664 B1 * | 12/2006 | Lee et al. | ....................... | 715/273 |
| 2006/0085750 A1 * | 4/2006 | Easton et al. | ................. | 715/708 |

* cited by examiner

*Primary Examiner* — Thu Huynh
(74) *Attorney, Agent, or Firm* — Bell Nunnally & Martin LLP; Craig J. Cox

(57) ABSTRACT

A document creation application, compound document format, and method for providing user assistance in a compound document are described. The compound documents are formed using a markup language and include both non-volatile text and user selected and/or input data. The compound documents also include embedded user assistance triggers, or links, at specific terms, concepts or user input areas which dynamically link a user to appropriate user assistance information in the document creation application. The method describes embedding user assistance links in compound documents to allow users to dynamically link to topic specific user assistance information.

20 Claims, 5 Drawing Sheets

FIG. 1

MULTISTATE FIXED RATE eNOTE-Single
Family-Fannie Mae UNIFORM INSTRUMENT Form 3200e4/02

E-NOTE — 11
17

14001 Bayou Shore Drive, Galveston, TX 77550

1. BORROWER'S PROMISE TO PAY

In return for a loan that I have received, I promise to pay U.S. $128040 (this amount is called "Principal"), plus interest, to the order of the Lender. The Lender is ⬤.

I will make all payments under this Note in the form of cash, check or money order.

I understand that the Lender may transfer this Note. The Lender or anyone who takes this Note by transfer and who is entitled to receive payments under this Note is called the "Note Holder."

2. INTEREST

Interest will be charged on unpaid principal until the full amount of Principal has been paid. I will pay interest at a yearly rate of 0⬤%.

The interest rate required by this Section 2 is the rate I will pay both before and after any default described in Section 6 (B) of this note.

FIG. 4

```
// Looping over all "SPAN" elements in document foreach (IHTMLElement element in
(IHTMLElementCollection)browser.WindowDocument.all.tags("SPAN"))
{
 // If span have an ID, it may have help defined
 if (element.id !=null && element.id != "")
 {
     // Searching for help in media file
     XmlElement helpElement = helpForSpanID(element.id);
     if (helpElement != null)
     {
         //If it found
         //Creating html image element <img>
         IHTMLImgElement imageEl =
(IHTMLImgElement)browser.WindowDocument.createElement("IMG");
         // Set picture URL to question mark
         imageEl.src =
Path.GetDirectoryName(Application.ExecutablePath) +
"//Images//help.jpg";
         // Remember ID
         imageEl.alt = element.id;
         //Changing cursor style to "hand"
         (imageEl as IHTMLElement).style.cursor = "Hand";
         //Adding image after other text (data) into datapoint span
         element.innerHTML = element.innerHTML + (imageEl as
IHTMLElement).outerHTML;
         //Set mouse click event handler for images (for all, since
IE loses it)
         foreach (IHTMLElement imgElement in
(IHTMLElementCollection)element.all)
         {
             if (imgElement is IHTMLElement)
             {
                 imgElement.onclick = helper;
             }
         }

```
namespace Encomia.Framework.MISMO.SmartDocument.v1_0_2
{
    public class Mortgage_Terms
    {
        private System.Double m_BaseLoanAmount;
        private string m_PaymentRemittanceDay;
        private System.Double m_RequestedInterestRatePercent;

public Mortgage_Terms()
        {
        }

[Encomia.Framework.Attributes.DescriptionAttribute("Base Loan Amount", "The base
        public virtual System.Double BaseLoanAmount
        {
            get
            {
                return this.m_BaseLoanAmount;
            }
```

FIG. 6

Interest will be charged
yearly rate of 0 ⓘ %.

20

14

METHOD AND SYSTEM FOR EMBEDDING USER ASSISTANCE IN DOCUMENTS UTILIZING MARKUP LANGUAGES

CROSS-REFERENCE TO RELATED APPLICATIONS

This application claims priority to U.S. Provisional Application No. 60/634,188, filed Dec. 8, 2004, which is incorporated by references herein in its entirety.

TECHNICAL FIELD

The concepts described herein relate generally to user interfaces in computer systems and more particularly to the use of extensible markup language to provide user assistance dynamically inside documents, particularly legal documents describing regulatory structure as evinced by legal text.

BACKGROUND OF THE INVENTION

When legislators and government entities draft statutes to regulate commerce, a certain type of legal language is employed to describe the various entities, their relationships, and constraints on behavior of said entities. These drafters often use limiting language and purposeful descriptions to specify the method to which laws, rules, and regulations must be obeyed. Entities affected by these regulations must comply using various means, including the use of computer processing systems to analyze information and determine with simplistic Boolean algebra if the presented information falls within the regulatory guidelines. These tests are authored by computer programmers using a multitude of computer languages on systems of varying size and complexity. All these systems have commonalities, including a limitation that the executable language is transmitted in whole apart from the data it contains. The data may be part (a resource) of the underlying executable program.

By using a compound document type based on XML, or eXtensible Markup Language and a description of the Boolean logic, a document can be created that contains all needed components for validating and processing a particular information sets' compliance with regulatory information directly relevant to the aforementioned document. This compound document contains sections that describe meta-information about the document, data in the form of discrete values, legal terminology, and legal conditions. The complexity of developing such a system involves the production of legal terms and conditions capable of satisfying the demanding exactitude of computer processing systems while maintaining human readability of legal terminology.

This legal terminology must be proved exactly and faithfully represented by the computer system in order to substantiate the human-readable legal text. The legal text binds the actions of the parties to a particular course or courses of action and represents a meeting of the minds. One problem that arises in such a context lies when the user is unsure or confused as to the type or nature of the data needed to complete a document, or what certain sections of the document are meant to accomplish. The traditional method for providing electronic user assistance is generally an online help file available from the applications menu bar. This type of user assistance takes the form of a secondary sub-application that is capable of stand-alone functioning. These types of help applications may not be able to discern the particular area the user needs help in, or the user may not know enough about the issue to specify the proper search terms in the help application. Recently, user assistance application have been embedded within the primary application, usually as a separate window pane, but these embedded applications still require the same type of trigger mechanism or user input as traditional help applications.

What is needed is a system and method for providing user assistance directly in the document which can trigger a help application from graphical icons inserted at specific points in the document.

BRIEF SUMMARY OF THE INVENTION

The concepts described herein are directed to a system and method which use a markup language to provide user assistance aids embedded in compound documents. The system and method inserts icons at key areas in a compound document that relate to term, concept, and user input locations which have associated user assistance information.

In a particular embodiment a document using a markup language is described which includes a primary, non-volatile layer containing text required for the document, and a first secondary layer containing variable document data provided by a user. The document further includes a second secondary layer containing embedded user assistance instructions, the user assistance instructions making an icon visible to the user in the document at items in the document that have available user assistance information, and providing a link to the user assistance information.

In another embodiment a method of providing user assistance in a compound document described, the method including creating a primary layer of non-volatile text, and creating variable input fields to accept user specified data. The method further includes embedding user assistance links in the compound document, the links located at items with available user assistance information.

In yet another embodiment a document creation application is described which includes one or more form documents displayable in a window, where the form documents include non-volatile text, user selected text and user inputted data. The form document further including embedded links to user assistance information, and a help file, wherein the help file is callable by the embedded links and contains user assistance information specific to each of the embedded links.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is an example of a compound document created using the concepts described herein;

FIG. 4 is a code sample of a user assistance aid in the text flow of a compound document in accordance with the concepts described herein;

FIG. 5 is a code sample of an application program base which calls a media.xml file in accordance with the concepts described herein;

FIG. 6 is a close up of a field in the compound document shown in FIG. 1; and

DETAILED DESCRIPTION OF THE INVENTION

Figures 2, 3:
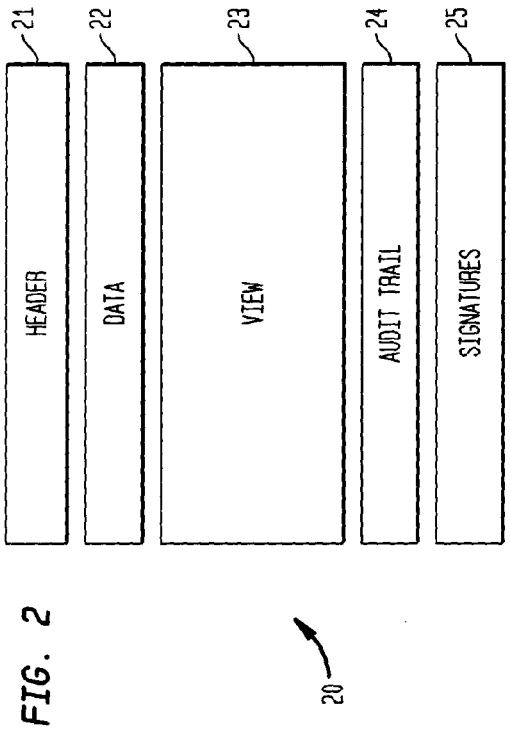
FIG. 2 is an example of an embodiment of a compound document hierarchy using a markup language.
FIG. 3 is a code sample of a medial.xml file in accordance with the concepts described herein.

The concepts described herein relate to a user interface in computer systems, and more particularly to the use of markup languages, such as eXtensible Markup Language (XML), to embed icons within a compound document that allow a user to dynamically access a help file or application, where the help application is able to provide the relevant information to the user based on the context of the document where the icon is located all without affecting the workflow or resulting output.

The concepts described herein uses XML to create multiple layers in a given compound document, which can be a SMARTDoc, and then dynamically inserting user assistance icons in key areas of the compound document relating to specific features, contractual terms, or required user input areas within the document. The user assistance icons can be selected, or clicked, by the user to trigger a help file or application that gives information on the specific feature, contractual term, or user input area of the document. The information can be provided to the user as an overlay on the application, as an embedded pane within the primary application, as a separate window, or any other way that would allow the user to receive information without interrupting the user's workflow.

The user assistance icons are linked to class-level objects embedded in the compound document that include logical data dictionary (LDD) comments within the code. These LDD comments are tied to specific attributes in the code and exterior media files to determine which user assistance topic to display. Standard reflections techniques, such as Microsoft NET reflection techniques, are used to display the correct user assistance topic.

To better understand the concepts described an the embodiments of the program discussed it may be helpful to have an understanding of some of the terms used herein. "Electronic document" or just "document" is meant to refer to the electronic representation of a document as a "file" by a computer system (e.g. a Microsoft Word "file" is a document file, because it represents a textual file in electronic format), vs. a printed document.

Extensible Markup Language, or "XML", is a derivative of hypertext markup language (HTML), a unique programming language used primarily in the World Wide Web environment to represent "web pages." Unlike HTML, which is relatively simple and constrained, XML is a highly sophisticated and flexible programming language used primarily to build World Wide Web-based software applications that run primarily in World Wide Web browsers.

A Logical Data Dictionary, or "LDD", is a compilation of methods, classes, objects, and various other code-based constructs used in a software application. An LDD generally defines the methods, classes, objects, and code-based constructs used in the software application and explains how they are used. Mortgage Industry Standards and Maintenance Organization, or "MISMO" is a standards body organized by the Mortgage Bankers Association ("MBA") to establish, and ultimately enforce, standards for electronic mortgages. MISMO has developed an LDD of code-based objects and a code-based hierarchy for populating SMARTDocs with variable source data. More information on this LDD can be found at http://www.mismo.org, the contents of which are hereby incorporated by reference.

A compound document, or SMARTDoc, is a type of electronic document which can utilize XML-based constructs to define "layers" that are used to separate static, unchangeable text from variable document-specific data. WYSIWYG, or "What You See Is What You Get." refers to a type of editor that is common throughout industry and lauded for their ease-of-use and their method of helping the user build documents with a visual interface that allows users to see what their end-document(s) will look like while the documents are being constructed. Examples of WYSIWYG editors include Microsoft Word, Microsoft PowerPoint, and others.

"User Assistance", also referred to as "help", or "online help", is normally provided by a software vendor as part of a software application to help users navigate and use the software application correctly and effectively to achieve the desired results. User assistance is traditionally provided in the programs "help" menu located on the task bar of the software application.

Referring now to FIG. 1, an example of a compound document, or SMARTDoc, according to the concepts described herein is described. Document 10 is an electronic document template, such as a SMARTDoc template which is, in this case, a promissory note, but could be any type of document, particularly legal documents that contain legal language and variable user inputs. As an example of a promissory note, document 10 contains user inputs for a borrower address 11, an amount borrowed 12, a lender 13 and an interest rate 14. Document 10 also contains legal language detailing the borrower's promise to repay 15 and interest rate terms 16. By using a compound document based on a markup language such as XML or any other similar markup language, user assistance icons, such as icons 17, 18, 19 and 20, can be directly tied to a user assistance application, or applications, such as online help files or applications, and/or explanatory audio or video files. Because each icon is tied to a specific portion of document 10, each icon can access the information or audio or video files that contain information specific to that section of the document or required user input.

For example, a term in a promissory note SMARTDoc such as interest rate 14 can have a user assistance icon 20 associated inserted next to the term. The user assistance icon is tied to an online help topic that defines "interest rate", sets out the type and format of the required user input data, and links to a video file that explains interest rates and its relationship to the loan document, and shows the user how to complete that user input.

Referring now to FIG. 2, an embodiment of a hierarchy 20 for a compound document is shown. Compound documents, or SMARTDocs, are multi-layer XML-based electronic documents that are generally used as executable (signable) documents and are divided into five (5) sections. The HEADER section 21 contains general information about the SMARTDoc itself, such as type, TDT, and style sheet references. The DATA section 22 contains document-specific variable data elements (e.g. name, address, or telephone number).

The VIEW section 23 is the viewable template-based section of the document that has the variable data from the DATA section inserted into the correct locations. The AUDIT TRAIL section 24 contains log information about the SMARTDoc, such as who signed the document and when, and is viewable by the user. The SIGNATURES section 25 contains the electronic images of any signatures that have been applied to the document.

The concepts described herein can be implemented in any type of document processing or word processing application, such as the eSign Desktop application developed by Encomia, L.P., of Houston Tex. As stated above, the purpose of exemplary embodiments of the system and method described is to provide term specific explanations for various aspects of a compound document, such as a form legal contract. Implementation is accomplished by using a multi-layer compound document programmed in a markup language such as XML in which the text, such as legal text, of the compound document is contained in a non-volatile layer, while code-based implementation of the concepts described herein for providing dynamic user assistance exist in a secondary layer. When compound documents in accordance with the present invention are generated the layers are merged together, creating a single seamless entity in which text, user assistance tags and data, and variable document specific data are included into one document.

FIG. 3 is an example of a code sample 30 used to implement a compound document according to the concepts described herein. In the example shown in FIG. 3, existing MISO XML based data fields are used as "markers" 31, 32 and 33 to indicate where help icons are required in the layered text flow of the compound document. The help icons are linked to a complied HTML help system, and if applicable, an audio or video file, as shown by reference numbers 34, 35 and 36, that provides additional information. Code sample 30 represents a "media.xml" file that functions as a called object from the application program base and determines which media, audio and/or video file to load for the help topic.

For example, in code sample 30, line 31 represents the XHTML XPATH for the targeted term "Base Loan Amount". A required parameter pointing to the compiled help file is located in line 34, along with the topic to be displayed, "LoanAmount.htm". The parameter segment "($apppath)" in line 34 is replaced dynamically at runtime by the application installation directory path, and instead of looking for a compiled help file (*.chm), the call looks for a medial file, such as an avi, mpg, wmv or other type of media, audio or video file that can be played by a media player installed on the user's system such as the Window's Media Player.

In order to insert user assistance aids into the text flow of a compound document, embodiments of the concepts described herein allow for the examination of the document looking for a SPAN-ID that has an associated XPATH data element in the document. If there is a SPAN-ID with an associated XPATH data element in the compound document, then a user assistance icon is inserted into the compound document at the location of the data element and the icon is linked to the appropriate help and/or media files.

FIG. 4 illustrates an example of an implementation of the user assistance aid in the text flow of a compound document. FIG. 5 illustrates an example of a code sample used to implement the concepts described herein in a compound document. The code sample in FIG. 4 represents an application program base that calls the media.xml file shown in FIG. 3 to determine which help, or media file (audio or video), to load for the help topic.

Referring again to FIG. 1 and now to FIG. 6, embodiments of the concepts described herein are described from the perspective of the user. As illustrated in FIG. 1, the user has immediate access to assistance which is immediately targeted to specific terms, concepts or user input areas as illustrated by icons 17, 18, 19 and 20 which might require explanation. The location of icons in FIG. 1 is merely meant to illustrate the concepts described herein and one skilled in the art would understand that any portion, concept, term, user input or other data could be linked to an icon and help or media file or application without departing from the scope of the concepts described herein.

The icons in document 10 provide an immediate link to a topic in a help system that addresses the specific term, concept, user input or other data identified by the icon. The topic may provide written description of the identified topic, may link to audio, video or other media files, may link to related concepts, may link to Internet addresses with more information on the topic, or may provide any other assistance that could be useful to the user in understanding the topic. Access is triggered when the user selects, or clicks, on the icon. FIG. 6 shows a close-up view of topic 14 and icon 20 from FIG. 1.

Figure 7:
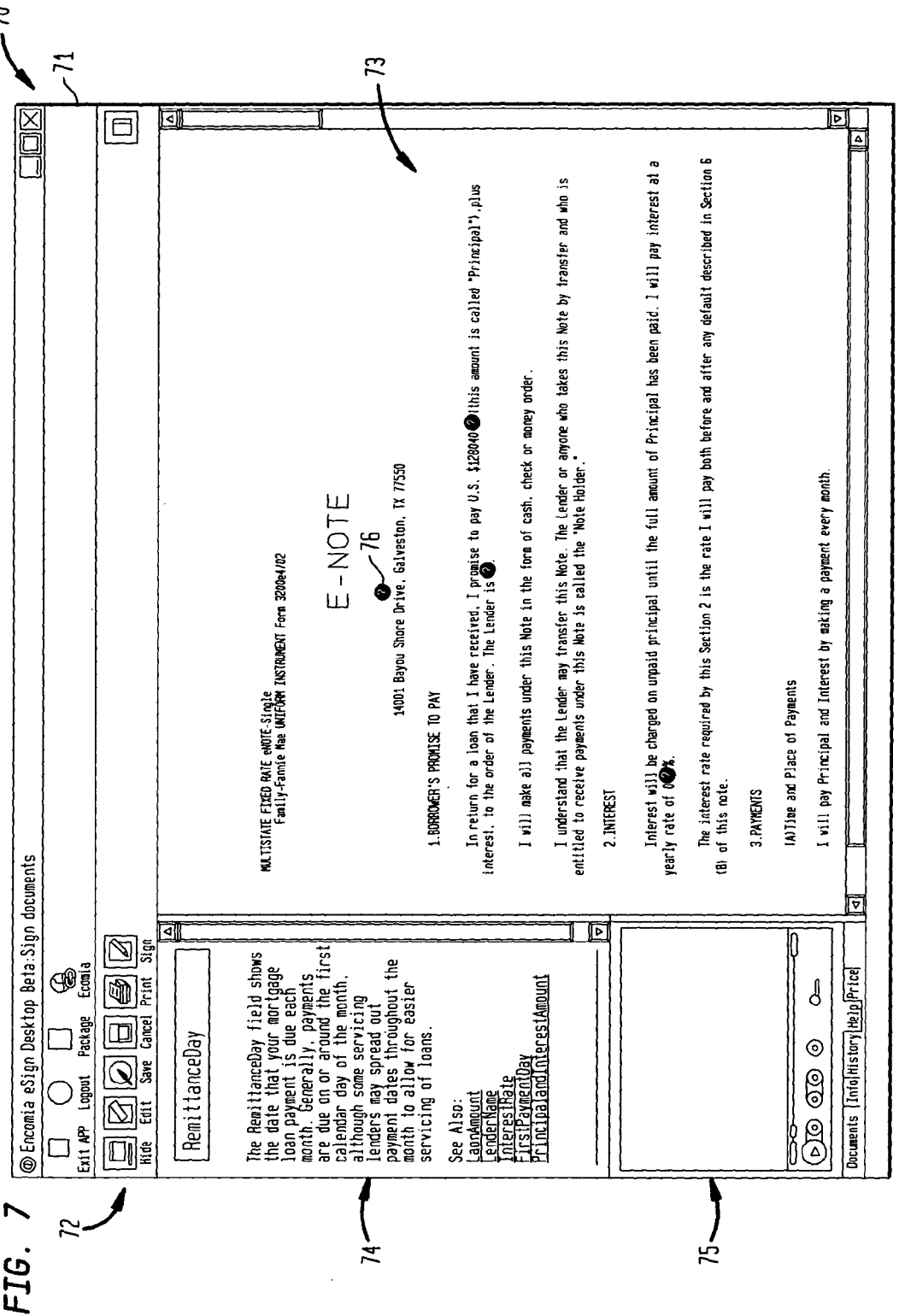
FIG. 7 is a screen shot of a document creation application in accordance with the concepts described herein.

FIG. 7 is a screen shot of an embodiment of an application 70 utilizing the concepts described herein. Application 70 is shown as a Windows based application which runs in window 71. Application 70 includes menu bar 72, which provides the user access to the application's functions, and application pane 73 in which the user is able to view and edit documents, such as document 10 from FIG. 1.

In accordance with the concepts described herein, the user is able to dynamically access user assistance using icons, such as icon 76, embedded in the document being edited in pane 73. Selecting, or clicking, on icon 76 access the help topic by opening help pane 74 and/or media player 75 which display the appropriate help information and/or play the appropriate media files. While FIG. 7 shows the help topics being opened in a pane within window 71, one skilled in the art would understand that the help information may be overlaid over the document in pane 73, may be displayed in a newly spawned window, or maybe displayed in other ways without departing from the scope of the concepts described herein.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A document using a markup language on a computer system comprising:
    a primary, non-volatile layer containing text required for the document;
    a first secondary layer containing variable document data provided by a user;
    a second secondary layer containing embedded user assistance instructions, including logical data dictionary comments, wherein the primary layer and first secondary layer are automatically examined for items that have associated user assistance information and the logical data dictionary is used to determine which user assistance information to link the items in the primary layer and first secondary layer to the associated user assistance information, the user assistance instructions making an icon visible to the user in the document at the items in the document that have available user assistance information, and providing a link to the user assistance information; and
    wherein the primary layer, first secondary layer and second secondary layer are merged into a single compound document.

2. The document of claim 1 wherein the items in the document that have available user assistance information include terms, concepts and user inputs.

3. The document of claim 1 wherein the document is a legal contract.

4. The document of claim 1 wherein the markup language is extensible markup language (XML).

5. The document of claim 1 wherein the user assistance information is an online help file.

6. The document of claim 1 wherein the user assistance information is a media file.

7. The document of claim 1 wherein the media file is a video file.

8. The document of claim 1 wherein the media file is an audio file.

9. A method of providing user assistance in a compound document comprising:
    creating a primary layer of non-volatile text;
    creating variable input fields to accept user specified data;
    scanning the non-volatile text and user specified data for items that have associated user assistance;
    embedding user assistance links, including logical data dictionary comments, in the compound document, the user assistance links located at the items with available user assistance information identified by the examining of the non-volatile text and user specified data, wherein the logical data dictionary comments are used to determine which user assistance information to display; and
    merging the non-volatile text, user specified data and user assistance links into a single compound document.

10. The method of claim 9 wherein the document is a legal contract.

11. The method of claim 9 wherein the compound document is created using a markup language.

12. The method of claim 11 wherein the markup language is extensible markup language (XML).

13. The method of claim 9 wherein the user assistance information is an online help file.

14. The method of claim 9 wherein the user assistance information is a media file.

15. A document creation application on a computer system comprising:
    at least one form document displayable in a window, the form document including non-volatile text, user selected text and user inputted data, the form document further including embedded links to user assistance information, the embedded links including logical data dictionary comments, wherein the embedded links are created by examining the non-volatile text, user selected text and user inputted data for items that have associated user assistance information and the logical data dictionary is used to determine which user assistance information to link the items in the non-volatile text, user selected text and user inputted data to the associated user assistance information; and
    a help file, wherein the help file is selected based on the logical data dictionary comments, and is callable by the embedded links and contains user assistance information specific to logical data dictionary comments in the embedded links;
    wherein the document creation application merges the non-volatile text, the user selected text, the user inputted data and the user assistance information into a single document.

16. The application of claim 15 wherein the help file opens in a sub-pane in the window when called.

17. The application of claim 15 wherein the user assistance information appears overlaid over the form document when the help filed is called.

18. The application of claim 15 wherein the help file when called opens a default media player.

19. The application of claim 15 wherein the form document uses extensible markup language (XML).

20. The application of claim 15 wherein the at least one form document is a legal contract.

* * * * *